United States Patent
Kimura (10) Patent No.: US 10,572,105 B2
(45) Date of Patent: Feb. 25, 2020

(54) INFORMATION PROCESSING DEVICE FOR SETTING A REACTION AREA CORRESPONDING TO GUI COMPONENT

(71) Applicant: TOYOTA JIDOSHA KABUSHIKI KAISHA, Toyota-shi, Aichi-ken (JP)

(72) Inventor: Hiroaki Kimura, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 368 days.

(21) Appl. No.: 15/212,841

(22) Filed: Jul. 18, 2016

(65) Prior Publication Data

US 2017/0031541 A1 Feb. 2, 2017

(30) Foreign Application Priority Data

Jul. 28, 2015 (JP) .................................. 2015-148808

(51) Int. Cl.
*G06F 3/00* (2006.01)
*G06F 3/0482* (2013.01)

(52) U.S. Cl.
CPC .................................. *G06F 3/0482* (2013.01)

(58) Field of Classification Search
CPC ... G06F 3/0481; G06F 3/04842; G06F 3/0482
See application file for complete search history.

(56) References Cited

U.S. PATENT DOCUMENTS

| | | | |
|---|---|---|---|
| 6,636,244 B1* | 10/2003 | Kelley | G06F 3/04842 715/781 |
| 2012/0011470 A1* | 1/2012 | Oh | G06F 3/04883 715/811 |
| 2012/0044173 A1 | 2/2012 | Homma et al. | |

(Continued)

FOREIGN PATENT DOCUMENTS

| | | |
|---|---|---|
| CN | 102662569 A | 9/2012 |
| JP | 2012-043266 A | 3/2012 |

(Continued)

OTHER PUBLICATIONS

Sep. 5, 2017 Partial Translation of Notification of Reason(s) for Refusal issued in Japanese Patent Application No. 2015-148808.

*Primary Examiner* — Stephen S Hong
*Assistant Examiner* — Marshon L Robinson
(74) *Attorney, Agent, or Firm* — Oliff PLC (57) ABSTRACT

An information processing device includes: a pointing device; a display unit; and a processor configured to cause the display unit to display a first GUI component selected by a cursor and a second GUI component, calculate a displacement of an input position in a predetermined coordinate system, set a reaction area in the predetermined coordinate system, set a selection area in the predetermined coordinate system based on a second coordinate, set the reaction area as an identified reaction area, cause the display unit to display the second GUI component, corresponding to the identified reaction area, as selected by the cursor, and set the reaction area so that a distance between the first coordinate and the second coordinate, required for the selection area to overlap with the reaction area with the overlapping area exceeding the overlapping criterion, becomes a predetermined distance.

9 Claims, 6 Drawing Sheets

(56) References Cited

U.S. PATENT DOCUMENTS

| | | | |
|---|---|---|---|
| 2012/0092332 A1* | 4/2012 | Tsukahara | G06F 3/0346 345/419 |
| 2013/0241853 A1* | 9/2013 | Tanaka | G06F 3/041 345/173 |
| 2014/0108927 A1* | 4/2014 | Vaidya | G06F 1/1694 715/708 |
| 2014/0137016 A1* | 5/2014 | Cui | G06F 3/0482 715/765 |
| 2015/0007116 A1 | 1/2015 | Visser | |
| 2016/0110069 A1* | 4/2016 | Tanoue | G06F 3/0482 715/845 |

FOREIGN PATENT DOCUMENTS

| | | |
|---|---|---|
| JP | 2014-533414 A | 12/2014 |
| JP | 2015/510190 A | 4/2015 |
| WO | 2009/128148 A1 | 10/2009 |
| WO | 2013/074333 A1 | 5/2013 |

\* cited by examiner

| GUI COMPONENT No. | SELECTED | DISPLAY POSITION | DISPLAY SIZE | ALTERNATE AREA POSITION | ALTERNATE AREA SIZE |
|---|---|---|---|---|---|
| E1 | ○ | (x1, y1) | (Δx1, Δy1) | | |
| E2 | | (x2, y2) | (Δx2, Δy2) | | |
| E3 | | (x3, y3) | (Δx3, Δy3) | | |
| E4 | | (x4, y4) | (Δx4, Δy4) | | |
| E5 | | (x5, y5) | (Δx5, Δy5) | (X5, Y5) | (ΔX5, ΔY5) |
| ⋮ | | | | | |

INFORMATION PROCESSING DEVICE FOR SETTING A REACTION AREA CORRESPONDING TO GUI COMPONENT

INCORPORATION BY REFERENCE

The disclosure of Japanese Patent Application No. 2015-148808 filed on Jul. 28, 2015 including the specification, drawings and abstract is incorporated herein by reference in its entirety.

BACKGROUND OF THE INVENTION

1. Field of the Invention

The present invention relates to an information processing device that moves a cursor on a screen based on an operation input via a pointing device.

2. Description of Related Art

On an information processing device with a configuration that allows the user to handle Graphical User Interface (GUI) components on the screen via a pointing device such as a touchpad or a mouse, the user moves the cursor via the pointing device to select a GUI component, Japanese Unexamined Patent Application Publication (Translation of PCT Application) No. 2014-533414 describes a configuration in which the user moves a circular cursor area on the screen with an input device and a GUI component to be selected is determined based on the ratio of the overlapping area, between the cursor area and each GUI component area, to the area of the GUI component.

SUMMARY OF THE INVENTION

On an information processing device on which one of a plurality of GUI components is put in the selected state by the cursor, one of the possible configurations is as follows. As the input position pointed to by the pointing device is changed, a cursor area, similar to the currently selected GUI component in size and shape, is generated in the area of that GUI component and is moved in the direction in which the input position is moved. However, in such a configuration, the ease of selection of a GUI component to be selected next, that is, the user operation load, varies according to the position, size, or shape of the area occupied by the currently selected GUI component.

For example, because the amount of movement of the cursor area to a desired GUI component varies according to the position of the currently selected GUI component, the user operation load varies. In addition, when the GUI components in the unselected state are arranged adjacently to each other, an effort is required to adjust the cursor-area movement direction for selectively overlapping the cursor area, beginning from a limited direction, with the GUI component areas located in the direction of the desired GUI component. Because this effort varies according to the position, size, and shape of the currently selected GUI component, the user operation load varies.

The present invention provides an information processing device that can reduce the possibility that the user operation load of selecting a GUI component varies according to a currently selected GUI component.

An information processing device in one aspect of the present invention includes: a pointing device configured to detect an input entered by a user to change position coordinates and to output input-position coordinates change information that includes a first coordinate and a second coordinate, the first coordinate indicating a start point of the input, the second coordinate indicating an end of the input; a display unit; and a processor configured to cause the display unit to display a first GUI component and a second GUI component, the first GUI component being a component selected by a cursor, the second GUI component being a component not selected by the cursor and arranged around the first GUI component, calculate a displacement of an input position in a predetermined coordinate system based on the input-position coordinates change information, the predetermined coordinate system being defined to be converted to a screen coordinate system of the display unit, set a reaction area, corresponding to the second GUI component, in the predetermined coordinate system using a coordinate range, the coordinate range being determined based on the first coordinate, set a selection area in the predetermined coordinate system based on the second coordinate, the selection area having a predetermined coordinate range corresponding to a size of the first GUI component, set the reaction area, which overlaps with the selection area with an overlapping area exceeding a predetermined overlapping criterion, as an identified reaction area, cause the display unit to display the second GUI component, corresponding to the identified reaction area, as selected by the cursor, and set the reaction area so that a distance between the first coordinate and the second coordinate, required for the selection area to overlap with the reaction area with the overlapping area exceeding the overlapping criterion, becomes a predetermined distance.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An information processing device in an embodiment of the present invention sets at least one of the coordinate position, shape, and size of the reaction areas with the first coordinates (the position coordinates at the time the input of user-input position coordinate change is started) as the reference so that the distance from the first coordinates to a GUI component not selected by the cursor, which is required to select that GUI component, becomes a predetermined distance. That is, even when the arrangement intervals of the GUI components from the first coordinates vary, the distance from the first coordinates to each GUI component, which is required to select that GUI component, is adjusted to the predetermined distance. In this way, the information processing device prevents the user operation load of selecting GUI components from being varied according to the arrangement of the GUI components but adjusts the operation load to a load corresponding to the predetermined distance that is set according to the currently selected GUI component.

One embodiment of the present invention is described below sequentially with reference to the drawings.

Figure 1:
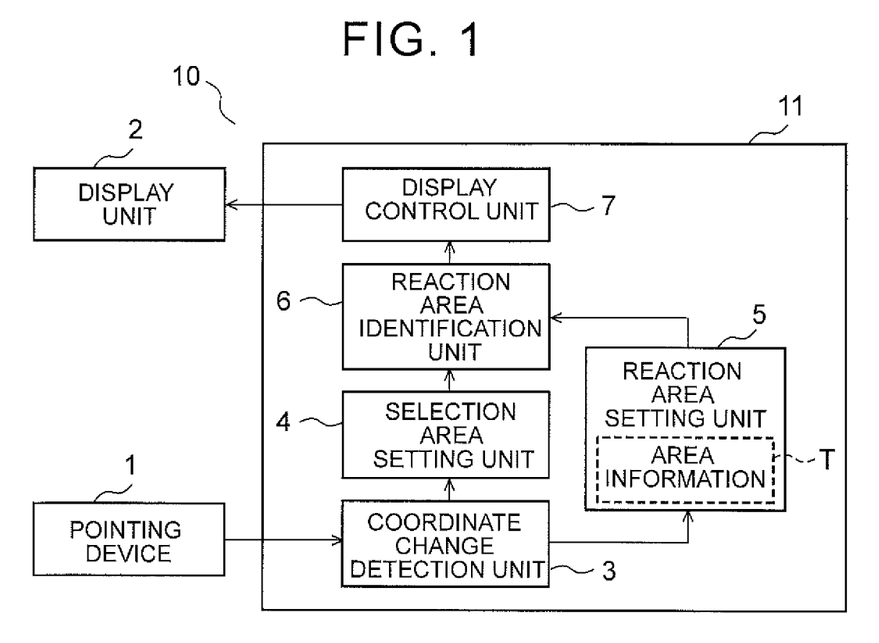
FIG. 1 is a block diagram showing the configuration of an information processing device in one embodiment of the present invention.

FIG. 1 is a diagram showing the outline configuration of an information processing device 10 in one embodiment of the present invention. The information processing device 10 is used to remotely operate GUI components on the screen provided as a console device in a vehicle for displaying GUI components thereon. The information processing device 10 includes a pointing device 1, a display unit 2, a coordinate change detection unit 3, a selection area setting unit 4, a reaction area setting unit 5, a reaction area identification unit 6, and a display control unit 7. The information processing device 10 further includes a processor 11 that performs calculation processing to implement the functions of the coordinate change detection unit 3, selection area setting unit 4, reaction area setting unit 5, reaction area identification unit 6, and display control unit 7.

The pointing device 1 is a remote operation input device such as a touchpad, a mouse, or a stylus pen. The pointing device 1 detects a user-input position coordinate change and sends the information on the position coordinate change to the coordinate change detection unit 3 that will be described later.

The display unit 2 displays a plurality of GUI components and a cursor that identifies one of the plurality of GUI components as a selected area. On the display screen, the state in which one of the GUI components is selected by the cursor is displayed. The cursor moves according to the displacement of the input position to select one of the plurality of areas. In the description below, the coordinates defined by the x-axis and the y-axis are used to identify a position on the screen. The x-axis is set in the horizontal direction on the screen (positive direction on the right side), and the y-axis in the vertical direction on the screen (positive direction on the top side). For the sake of description, the areas displayed on the screen are the same sized rectangles, each composed of the opposite sides parallel to the x-axis and the opposite sides parallel to the y-axis. It should be noted, however, that the areas may or may not be the same in size and shape.

Figure 2A:
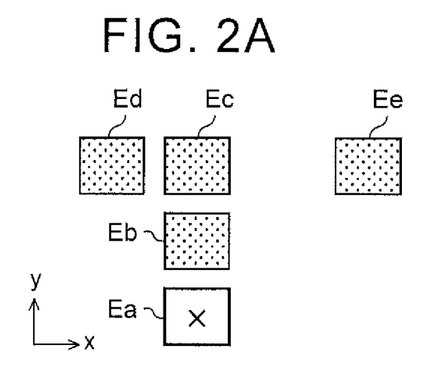
FIG. 2A is a diagram showing the outline of the operation of the information processing device to illustrate the movement process of the cursor area on a time series basis.

For example, as shown in FIG. 2A, a plurality of areas (GUI components), areas Ea-Ee, are displayed on the screen. The area Ea is a selected area that is an area (GUI component) identified by the cursor and placed in the selected state. The areas Eb to Ee are unselected areas that are areas not selected by the cursor. In FIG. 2A, it is assumed that the area Ea, area Eb, and area Ec are arranged in this order in the positive direction of the y-axis and that the area Ee is positioned apart from the area Ec in the positive direction of the x-axis. Using this arrangement of the areas as an example, the configurations of the units are described below.

Figure 2B:
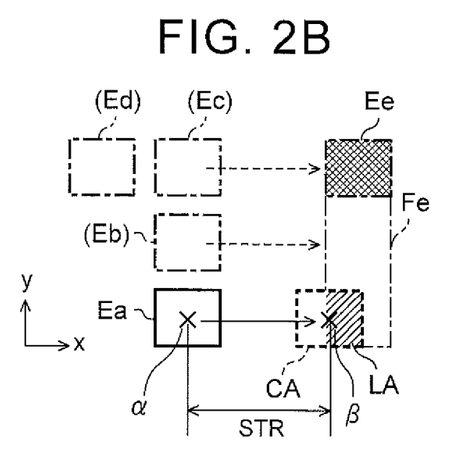
FIG. 2B is a diagram showing the outline of the operation of the information processing device to illustrate the movement process of the cursor area on a time series basis.

The coordinate change detection unit 3 calculates the displacement of the input position in the coordinate system, defined to be converted to the screen coordinate system of the display unit 2, each time user-input position coordinate change information is received from the pointing device 1. While the position coordinate change information is continuously received from the pointing device 1, one user input for moving the cursor is assumed to be continued and, each time the position coordinate change information is received, the displacement is added up. Each time the user-input position coordinate change information is received, the coordinate change detection unit 3 sends the information, which indicates that a user input is received, to the selection area setting unit 4 and the reaction area setting unit 5. When one user input is ended, the coordinate change detection unit 3 sends the information on the position coordinates (second coordinates), which has been changed based on the added-up displacement from the position coordinates (first coordinates) at which the user input is started, to the selection area setting unit 4. In FIG. 2B, the first coordinates are the position of the area Ea, and the second coordinates are the position of the cursor area CA indicated by the broken lines, as will be described later.

The selection area setting unit 4 sets the cursor area (selection area) CA in the coordinate range, which is a range based on the position coordinates at the time the one user input is ended (second coordinates), in the coordinate system used by the coordinate change detection unit 3. The coordinate range is set according to the size of the selected area. For example, the coordinate range is set such that the larger the selected area is, the larger the cursor area CA is, and the smaller the selected area is, the smaller the cursor area CA is. The coordinate area may also be set in such a way that the cursor area CA has the same shape as that of the selected area and has a size that is a constant factor larger than that of the selected area. As shown in FIG. 2B, when the coordinate change detection unit 3 finishes the calculation of the displacement corresponding to one user input, the selection area setting unit 4 sets the cursor area CA in the coordinate range that occupies the area of the same size and shape as those of the area Ea. In this case, the cursor area CA is set in this coordinate range, based on the position coordinates $\beta$ (second coordinates) that are apart from the position coordinates $\alpha$ (first coordinates) in the x-axis positive direction that is the direction of the input-position movement from the position coordinates $\alpha$. In this example, the cursor area CA is not displayed on the screen.

The reaction area setting unit 5 sets the reaction areas (indicated by the dashed lines in FIG. 2B), each corresponding to an unselected area arranged around the selected area, using the coordinate ranges, which are determined based on the first coordinates, in the coordinate systems used by the coordinate change detection unit 3. The reaction area setting unit 5 sets at least one of the coordinate position, shape, and size of a reaction area so that the distance STR, which is a distance from the first coordinates to the second coordinates over which the cursor moves to select a GUI component not selected by the cursor, becomes a predetermined distance. This predetermined distance is set as a fixed distance or as a plurality of distances distributed in a range having a distribution width. This predetermined distance may be set for each GUI component not selected by the cursor or may be set according to the arrangement interval among a plurality of selectable GUI components. In this case, the reaction area setting unit 5 sets the predetermined distance in such a way that the relatively smaller the arrangement interval between the GUI components is, the larger is the distance from the first coordinates required to select a GUI component not selected by the cursor and that the relatively larger the arrangement interval of the GUI components is, the smaller is the distance from the first coordinates required to select a GUI component not selected by the cursor. In FIG. 2B, for the arrangement interval between the area Ea and the area Ee and between the area Eb and the area Ee that is relatively large, the distance from the first coordinates, required to select a GUI component not selected by the cursor, is reduced to the distance STR.

The reaction area setting unit 5 stores the setting information T, which defines the coordinate ranges of the reaction areas in advance, corresponding to the layout of the GUI components in relation to the first coordinates. The setting information T defines the reaction area position information on which the setting of the distance between the first coordinates and the coordinate range of the cursor area CA is reflected as described above. For example, according to the area of the selected area, the setting information T defines which coordinate range is set as the coordinate range of a reaction area: the coordinate range of an unselected area or the coordinate range of an alternate area defined as different from the coordinate range of an unselected area. The coordinate range of an alternate area is information added, as necessary, to define the distance setting. The reaction area setting unit 5 sets the coordinate ranges of the reaction areas based on the setting information T.

Figure 2C:
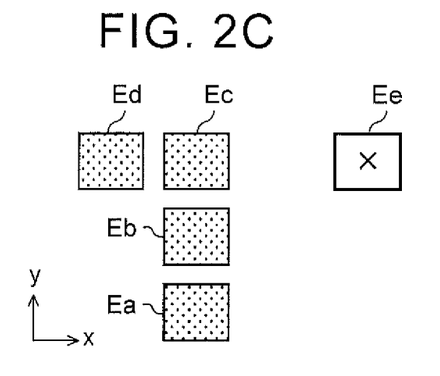
FIG. 2C is a diagram showing the outline of the operation of the information processing device to illustrate the movement process of the cursor area on a time series basis.
Figure 3:
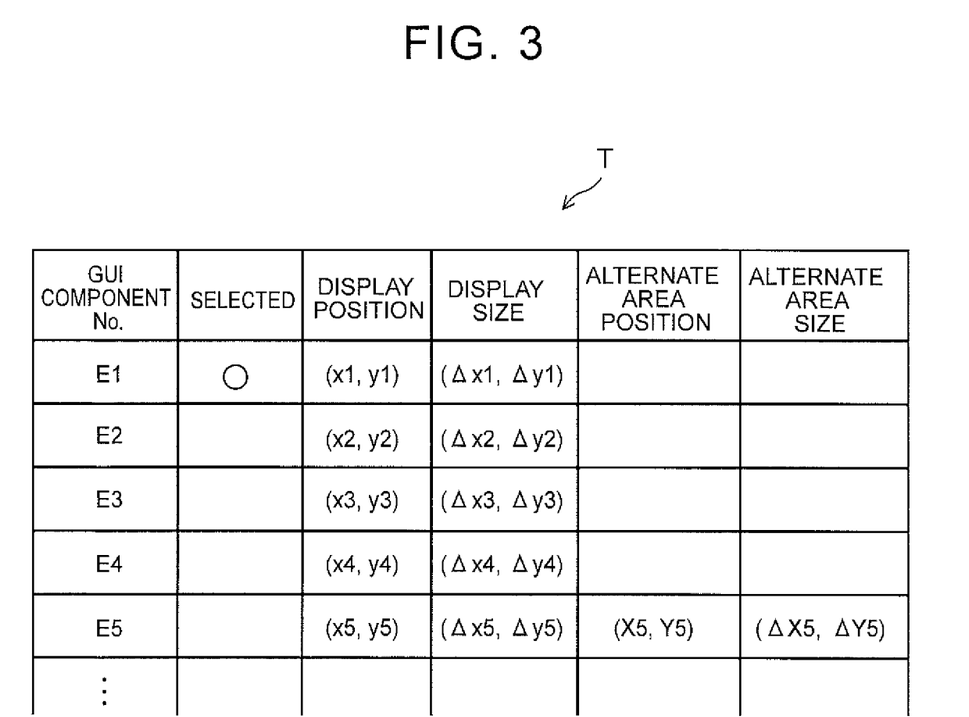
FIG. 3 is a diagram showing the setting information used by the information processing device.

For example, as shown in FIG. 3, the setting information T includes the information on the display position and the display size of the area defined for each of the areas identified by the GUI component numbers (E1, E2, E3, E4, E5, . . . ). For example, the areas Ea to Ee, shown in FIG. 2A, FIG. 2B, and FIG. 2C, correspond respectively to the GUI component numbers E1 to E5. The setting information T in FIG. 3 is configured to include not only the information on the areas, shown in FIG. 2A, FIG. 2B, and FIG. 2C, but also the information on any plurality of areas. Each area has the shape of a rectangle (square or rectangle) having the two sides extending in the x-axis direction and the two sides extending in the y-axis direction, with the display position of each area represented by the coordinates of the center of the area. The setting information T represents the display size of each area with the size in the x-axis direction and the size in the y-axis direction.

For the GUI component number of an area that is a selected area (E1 in this example), the setting information T defines the coordinate ranges of the reaction areas that are set for the unselected areas indicated by the other GUI component numbers. As the criterion for determining whether the coordinate range of a reaction area to be set is the coordinate range of an unselected area or the coordinate range of an alternate area, the setting information T shown in FIG. 3 additionally includes the information on the alternate area position and the alternate area size.

For the reaction area of an unselected area which has a GUI component number corresponding to an unselected area and to which the information on the alternate area position and the alternate area size is not added (that is, E2 to E4), the setting information T shown in FIG. 3 indicates that the coordinate range indicated by the display position and the display size of the area (that is, the same coordinate range as that of the unselected area) is used. For the reaction area of an unselected area which has a GUI component number corresponding to an unselected area and to which the information on the alternate area position and the alternate area size is added (that is, E5), the setting information T indicates that the coordinate range indicated by the alternate area position and the alternate area size (that is, the coordinate range of the alternate area) is used.

In this example, an alternate area has the shape of a rectangle (square or rectangle) having the two sides extending in the x-axis direction and the two sides extending in the y-axis direction, with the position of the alternate area represented by the coordinates of the center of the alternate area. In addition, the setting information T represents the size of an alternate area with the size in the x-axis direction, and the size in the y-axis direction, of the alternate area. In this example, an alternate area is not displayed on the screen. In FIG. 2B, the coordinate ranges of the reaction areas of the area Eb, area Ec, and area Ed are respectively the coordinate ranges of the area Eb, area Ec, and area Ed. In addition, in FIG. 2B, the coordinate range of the reaction area of the area Ee is the coordinate range of the alternate area Fe of the area Ee.

In FIG. 2A, the arrangement interval between the area Ee and the areas Ea and Eb is relatively larger than the distance between the area Ee and the area Ec. Therefore, as shown in FIG. 2B, the alternate area Fe is set in the coordinate range that is created by extending the area Be in the negative direction of the y-axis to the position opposite to the area Ea along the x-axis. In this way, the alternate area Fe is set by changing the coordinate position, shape, and size of the area Ee so that the minimum distance between the first coordinates and the second coordinates becomes smaller when the input position is displaced from the first coordinates to the alternate area Fe than when the input position is displaced from the first coordinates to the area Ee.

In this example, the area Ec, one of the other GUI components of the area Ea, is arranged on the positive-direction side of the y-axis that is one of the sides with respect to the area Ea that is at the first coordinates. The area Ee, still another one of the other GUI components of the area Ea, is arranged in parallel to the area Ec in the direction along the x-axis perpendicular to the y-axis. Therefore, the user operation load of displacing the input position from the area Ea to the alternate area Fe in the positive direction of the x-axis is equivalent to the user operation load of displacing the input position from the area Ec to the area Ee when the area Ec is at the first coordinates. Similarly, if the same alternate area Fe is set when the area Eb positioned between the area Ea and area Ec is at the first coordinates, the user operation load of displacing the input position from the area Eb to the alternate area Fe is equivalent to the operation load of displacing the input position from the area Ec to the area Ee and from the area Ea to the alternate area Fe.

Although not shown in FIG. 3, the coordinate ranges of reaction areas, which are set when an area with a GUI component number other than the GUI component number E1 is a selected area, are defined in the setting information T.

The reaction area identification unit 6 identifies a reaction area that overlaps with the cursor area CA with an overlapping area exceeding a pre-defined overlapping criterion. As the overlapping criterion, the threshold of an area overlapping with the cursor area CA or the threshold of the ratio of the overlapping area with the cursor area CA to the area of the reaction area may be used. For example, in FIG. 2B, the reaction area identification unit 6 determines whether there is a reaction area that overlaps with the cursor area CA with an overlapping area exceeding the pre-defined overlapping criterion and identifies that the alternate area Fe, which overlaps with the cursor area CA in the area LA, is the reaction area. If there is not a reaction area that overlaps with the cursor area CA with an overlapping area exceeding the overlapping criterion, the reaction area identification unit 6 does not identify a reaction area.

The display control unit 7 causes the display unit 2 to display a plurality of GUI components and the cursor that identifies one of the plurality of GUI components as a selected area. In addition, the display control unit 7 causes the display unit 2 to display a GUI component, corresponding to one of the reaction areas identified by the reaction area identification unit 6, in the mode in which the area is identified by the cursor as a selected area. For example, as shown in FIG. 2C, the display control unit 7 causes the cursor to be moved to the area Ee, corresponding to the reaction area (alternate area Fe) identified by the reaction area identification unit 6, and causes the display unit 2 to display the screen on which the area Be is in the selected state.

Figure 4:
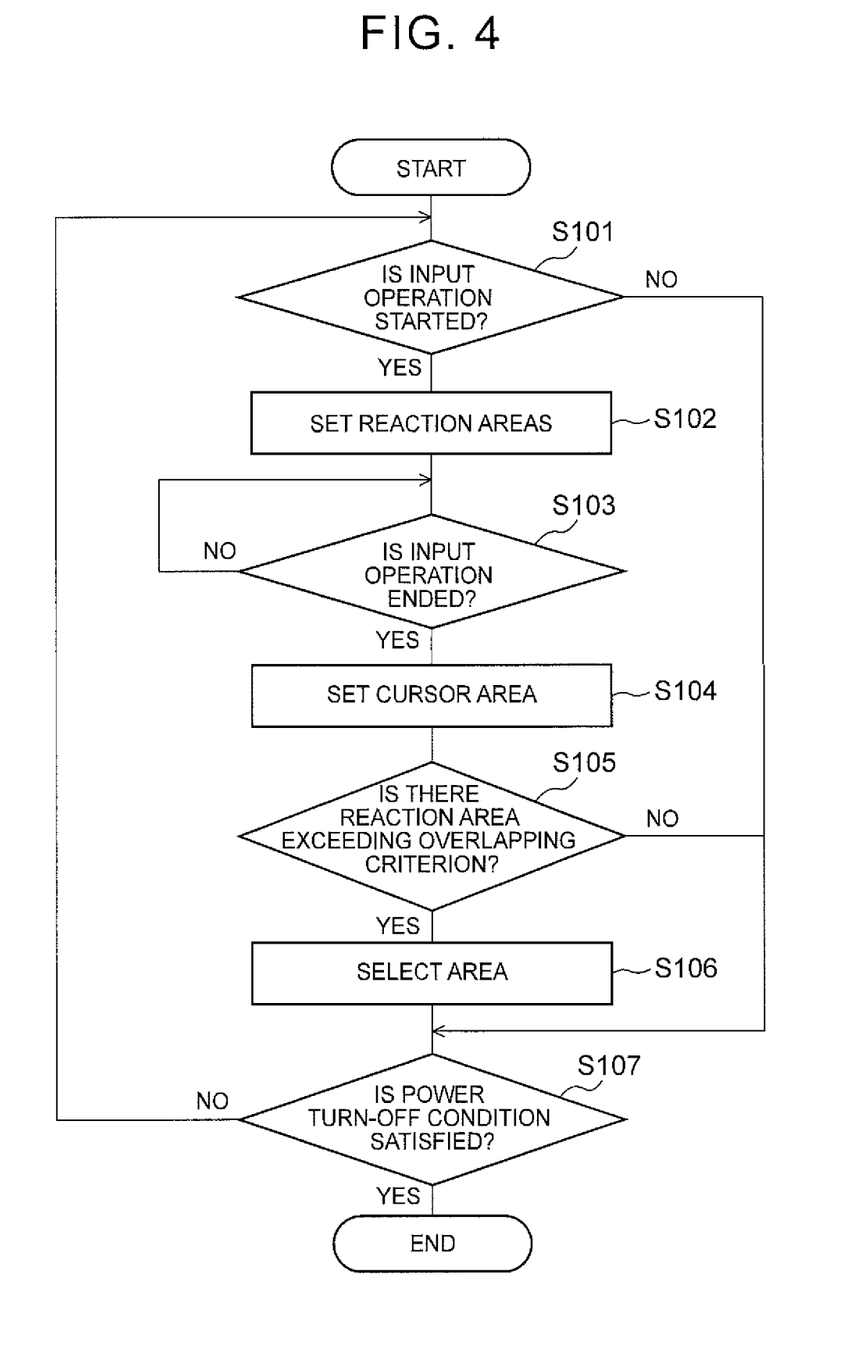
FIG. 4 is a flowchart showing the processing procedure of the information processing device.

Next, the processing procedure performed by the info nation processing device 10 with the above configuration is described with reference to the flowchart shown in FIG. 4. This flow is implemented by executing the program, stored in the storage medium of the computer, by a processor 11 of the computer included in the information processing device 10.

This flow is started by turning on the power of the information processing device 10. When the power is turned on, the screen on which the areas are arranged is displayed. In the initial state, one of the areas, which is set in advance, is a selected area.

First, in step S101, the coordinate change detection unit 3 determines whether the input operation is started, based on the user-input position coordinate change information received from the pointing device 1. The input operation is started, for example, when the swipe operation is started on the touchpad or the drag operation of the mouse is started. If it is determined in step S101 that the input operation is started, the processing proceeds to step S102. If it is determined in step S101 that the input operation is not yet started, the processing proceeds to step S107.

In step S102, the reaction area setting unit 5 references the setting information T to set the coordinate ranges of the reaction areas of the unselected areas based on the selected area (GUI component at the first coordinates).

In step S103 that follows, the coordinate change detection unit 3 determines whether the input operation is ended, based on the user-input position coordinate change information received from the pointing device 1. If it is determined in step S103 that the input operation is ended, the processing proceeds to step S104. If it is determined in step S103 that the input operation is not yet ended, step S103 is repeated.

In step S104, the selection area setting unit 4 sets the coordinate range of the cursor area CA, based on the second coordinates that are the position coordinates when the user input is ended.

In step S105, the reaction area identification unit 6 determines whether there is a reaction area that overlaps with the cursor area CA with an overlapping area exceeding the pre-defined overlapping criterion. If it is determined in step S105 that there is such a reaction area, the reaction area identification unit 6 identifies the reaction area and the processing proceeds to step S106. If it is determined in step S105 that there is no such reaction area, the processing proceeds to step S107.

In step S106, the display control unit 7 causes the display unit 2 to display the GUI component, corresponding to the reaction area identified in step S105, in a mode in which the GUI component is identified by the cursor.

In step S107, the information processing device 10 determines whether the power turn-off condition for the information processing device 10 is satisfied, for example, whether the power-off button is pressed. If it is determined in step S107 that the power turn-off condition is satisfied, the flow is ended. If it is determined in step S107 that the power turn-off condition is not satisfied, the processing returns to step S101.

Another configuration is also possible in which the end of the input operation is not confirmed in step S103 but a GUI component is determined selected when it is determined that a reaction area overlaps with the cursor area CA, which is generated in the selected area at the same time the user input is started and then moved, with an overlapping area exceeding the overlapping criterion.

Next, various modifications of reaction areas that are set for a plurality of areas are described below.

Figure 5A:
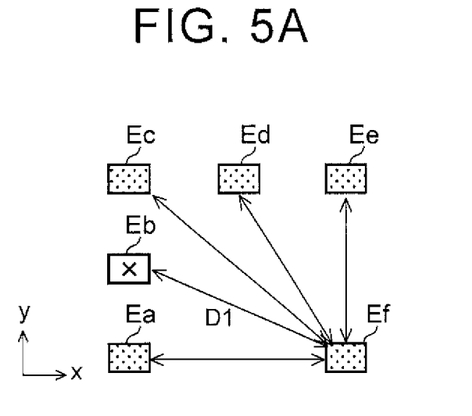
FIG. 5A is a diagram showing a first modification of the information processing device to illustrate the arrangement of a selected area and unselected areas.
Figure 5B:
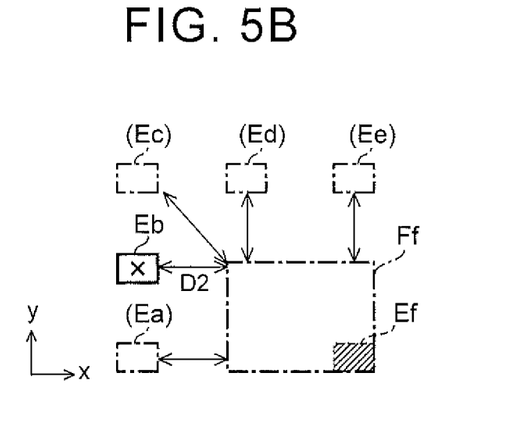
FIG. 5B is a diagram showing the first modification of the information processing device to illustrate the reaction areas that are set in the arrangement.

FIG. 5A and FIG. 5B are diagrams showing a first modification. FIG. 5A shows the state in which a plurality of areas Ea to Ef are displayed on the screen. The areas Ea to Ee are arranged in the L-shaped layout with the area Ec in the corner. The areas Ea to Ec are sequentially arranged in the positive direction of the y-axis, and the areas Ec to Ee in the positive direction of the x-axis. It is assumed that one of the areas Ea to Ee, for example, the area Eb, is the selected area. The area Ef, one of the unselected areas, is positioned at the position opposite to the interior angle of the letter L, or at the position determined by the x-coordinate of the area Ee and the y-coordinate of the area Ea. The arrangement interval between the area Ef and any of the other areas Ea to Ee is relatively larger than the arrangement interval between any two of the areas Ea to Ee.

In FIG. 5B, the reaction areas of the areas Ea, Ec, Ed, Ee, and Ef are indicated by the dashed lines. The coordinate ranges of the reaction areas of the areas Ea, Ec, Ed, and Ee are the coordinate ranges of the areas Ea, Ec, Ed, and Ee, respectively, and the coordinate range of the reaction area of the area Ef is the coordinate range of the alternate area Ff of the area Ef. The alternate area Ff corresponds to an area created by enlarging the area Ef in such a way that at least the position and the size of the area Ef are changed. The separation distance D2, the minimum clearance distance between the area Eb and the alternate area Ff, is smaller than the separation distance D1, the minimum clearance distance between the area Eb and the area Ef. At the same time, the separation distance D2 between each of the areas Ea, Ec, Ed, and Ee and the alternate area Ff is smaller than the separation distance D1 between each of the areas Ea, Ec, Ed, and Ee and the area Ef, respectively. The separation distance D1 and the separation distance D2 are values defined for each pair of areas.

The separation distance D2 may be set to a value equal to or smaller than a first distance that is the criterion value. The first distance is a distance smaller than the separation distance D1.

When one of the areas Ea to Ee is the selected area, the minimum clearance distance between each of the areas Ea to Ee and the alternate area Ff is set to the separation distance D2. Therefore, this modification allows the distance between the first coordinates and the second coordinates, required to select a GUI component not selected by the cursor, to be adjusted to a predetermined distance. This means that, when not only the area Eb but also any of the areas Ea to Ee is the selected area, the operation load of moving the cursor area CA from the selected area to the alternate area Ff becomes smaller than the operation load of moving the cursor area CA from the selected area to the area Ef.

Figure 6A:
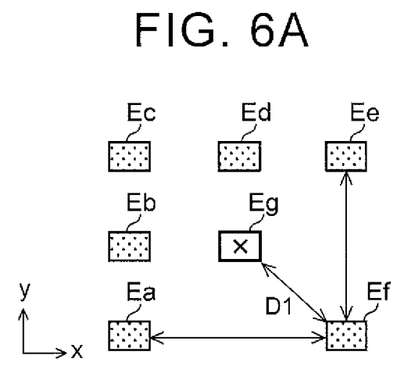
FIG. 6A is a diagram showing a second modification of the information processing device to illustrate the arrangement of a selected area and unselected areas.
Figure 6B:
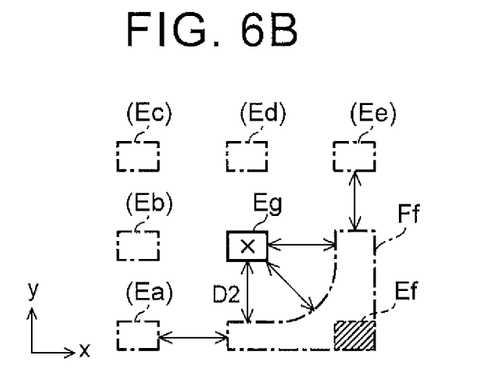
FIG. 6B is a diagram showing the second modification of the information processing device to illustrate one form of the reaction areas that are set in the arrangement.
Figure 6C:
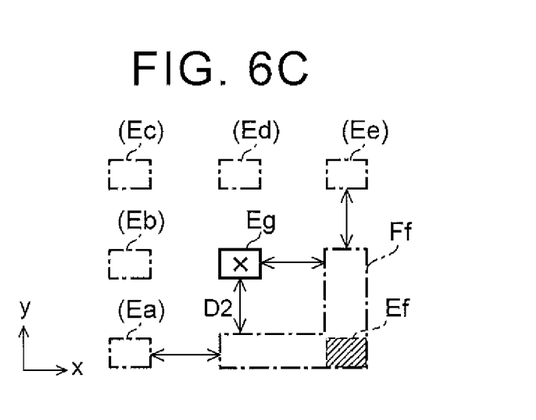
FIG. 6C is a diagram showing the second modification of the information processing device to illustrate another form of the reaction areas that are set in the arrangement.

FIGS. 6A, 6B, and FIG. 6C are diagrams showing a second modification. FIG. 6A shows the state in which a plurality of areas Ea to Eg are displayed on the screen. The areas Ea to Ef are arranged in the same way as the areas Ea to Ef in FIG. 5A. To this arrangement, the area Eg is added at the position determined by the x-coordinate of the area Ed and the y-coordinate of the area Eb. In this example, it is assumed that any one of the areas Ea, Ee, and Eg opposed to the area Ef, for example, the area Eg, is the selected area. The arrangement interval between the area Ef and any of the areas Ea, Ee, and Eg is relatively larger than the arrangement interval between any two of the areas Ea to Ee.

In FIG. 6B, the reaction areas of the areas Ea to Ef are indicated by the dashed lines. The coordinate ranges of the reaction areas of the areas Ea, Eb, Ec, Ed, and Ee are the coordinate ranges of the areas Ea, Eb, Ec, Ed, and Ee, respectively, and the coordinate range of the reaction area of the area Ef is the coordinate range of the alternate area Ff of the area Ef. The alternate area Ff corresponds to an area created by enlarging the area Ef in such a way that the position, size, and shape of the area Ef are changed. The separation distance D2, the minimum clearance distance between the area Eg and the alternate area Ff, is smaller than the separation distance D1, the minimum clearance distance between the area Eg and the area Ef. In addition, the end of the alternate area Ff, opposed to the area Eg, is curved so that the separation distances D2 between each opposed position and the area Eg fall evenly within a predetermined variation range.

At the same time, the separation distance D2 between each of the areas Ea and Ee and the alternate area Ff becomes smaller than the separation distance D1 between each of the areas Ea and Ee and the area Ef, respectively, in the similar way that this separation distance D2 becomes closer to the separation distance D2 between the area Eg and the alternate area Ff. The separation distance D1 and the separation distance D2 are values defined for each pair of areas. The separation distance D2 may be set to a value equal to or smaller than a first distance that is the criterion value. The first distance is a distance smaller than the separation distance D1.

When one of the areas Ea, Ee, and Eg is the selected area, the minimum clearance distance between each of the areas Ea, Ee, and Eg and the alternate area Ff is set to the separation distance D2. Therefore, this modification allows the distance between the first coordinates and the second coordinates, required to select a GUI component not selected by the cursor, to be adjusted to a predetermined distance. This means that, when not only the area Eg but also any of the areas Ea, Ee, and Eg is the selected area, the operation load of selecting the area Ef from the selected area becomes the similar load.

In addition, the alternate area Ff may be set as shown in FIG. 6C. This alternate area Ff is configured by extending the area Ef in the negative direction of the x-axis and in the positive direction of the y-axis. The alternate area Ff, if configured in this manner, allows the separation distance D2 between the area Eg and the alternate area Ff along the x-axis and that along the y-axis to become smaller than the separation distance D1 between the area Eg and the area Ef. At the same time, the separation distance D2 between each of the areas Ea and Ee and the alternate area Ff becomes smaller than the separation distance D1 between each of the areas Ea and Ee and the area Ef, respectively, in the similar way that this separation distance D2 becomes closer to the separation distance D2 between the area Eg and the alternate area Ff along the x-axis and along the y-axis. The end of the alternate area Ff, opposed to the area Eg, has a simple shape fixated by the lines along the x-axis and the y-axis.

Figure 7A:
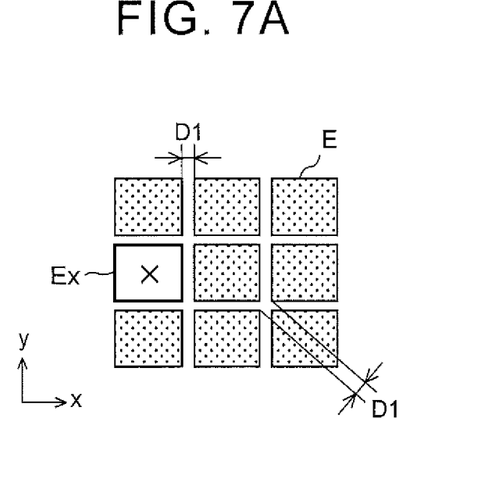
FIG. 7A is a diagram showing a third modification of the information processing device to illustrate the arrangement of a selected area and unselected areas.
Figure 7B:
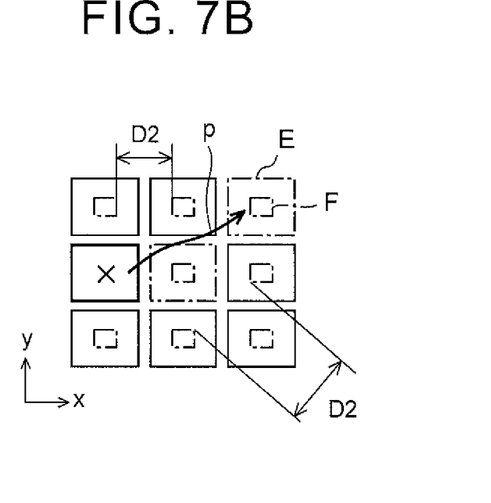
FIG. 7B is a diagram showing the third modification of the information processing device to illustrate the reaction areas that are set in the arrangement.

FIG. 7A and FIG. 7B are diagrams showing a third modification. FIG. 7A shows the state in which the screen is displayed where a plurality of areas E are arranged in a matrix-like group. It is assumed that the area Ex, one of the plurality of areas E, is the selected area. This group is in an aggregated state in which the areas E have a clearance between them that is too small for the cursor area CA to separately select an unselected area from the group. The value of the separation distance D1, the minimum clearance distance between the adjacent areas E, is defined for each clearance between the areas E. The arrangement interval between the areas E is relatively smaller than the standard arrangement interval that can be set on the screen.

In FIG. 7B, the reaction areas of the areas E are indicated by the dashed lines. The coordinate range of each reaction area is the coordinate range of the alternate area F that corresponds to an area created by reducing the area E in at least one of the x-axis direction and the y-axis direction without changing the position. The separation distance D2, the minimum clearance distance between a pair of adjacent alternate areas F, becomes larger than the separation distance D1 between the areas E that correspond to that pair of alternate areas F so that the selective overlapping between the cursor area CA and the alternate area F is possible as indicated by the arrow p. The value of the separation distance D2 is defined for each pair of alternate areas F. The separation distance D2 may be set to a value equal to or larger than a second distance that is the criterion value. The second distance is a distance larger than the separation distance D1.

In this modification, when the area Ex is the selected area, the minimum clearance distance between the alternate areas F is set to the separation distance D2. Therefore, this modification allows the distance between the first coordinates and the second coordinates, required to select a GUI component not selected by the cursor, to be adjusted to a predetermined distance. This means that this modification reduces the large operation load of selecting an unselected area, included in the group, from the selected area.

Figure 8:
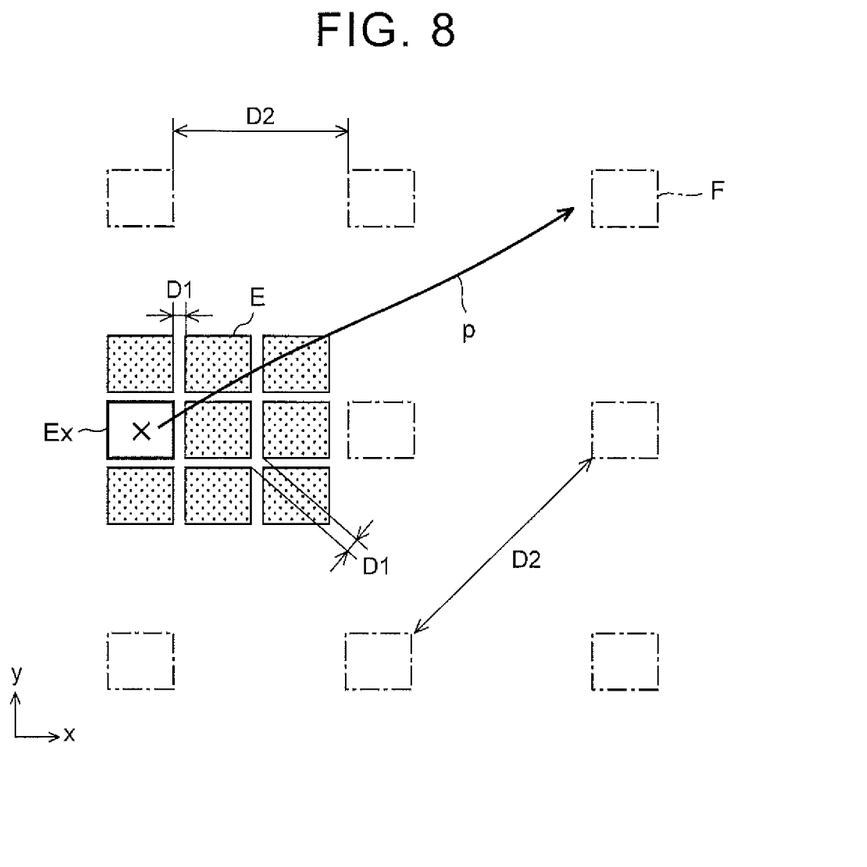
FIG. 8 is a diagram showing a fourth modification of the information processing device.

FIG. 8 is a diagram showing a fourth modification. A plurality of areas E, similar to those in FIG. 7A, is displayed on the screen. On this screen, the arrangement interval between the areas E is relatively smaller the standard arrangement interval that can be set for the range of the entire screen where the user input is received. It is assumed that the area Ex, one of the plurality of areas E, is the selected area. The reaction areas of the areas E are indicated by the dashed lines. The coordinate range of each reaction area is the coordinate range of the alternate area F that is obtained, with the position of the area Ex fixed, by moving the coordinate range of an unselected area E into the same direction as that of the unselected area E relative to the area Ex. That is, the alternate area F corresponds to an area created by changing at least the position of the area E.

The separation distance D2, which is the minimum clearance distance between the adjacent reaction areas and the separation distance D2, which is the minimum clearance distance between the area Ex and the reaction area adjacent to the area Ex, are a predetermined number of times larger than the separation distance D1 that is the minimum clearance distance between the corresponding areas E before the movement. This separation distance D2 is so large that the selective overlapping between the cursor area CA and the alternate area F is possible as indicated by the arrow p. The separation distance D2 may be set to a distance equal to or larger than a second distance that is the criterion value. The second distance is a distance larger than the separation distance D1.

In this modification, when the area Ex is the selected area, the minimum clearance distance between the alternate areas F is set to the separation distance D2. Therefore, this modification allows the distance between the first coordinates and the second coordinates, required to select a GUI component not selected by the cursor, to be adjusted to a predetermined distance. This means that this modification reduces the operation load of selecting an unselected area, included in the group, from the selected area. When a plurality of areas E is displayed densely in a small area, this modification allows the user to perform the operation in a usual operation range using the pointing device 1 to move the input position for selecting an area.

Figure 9A:
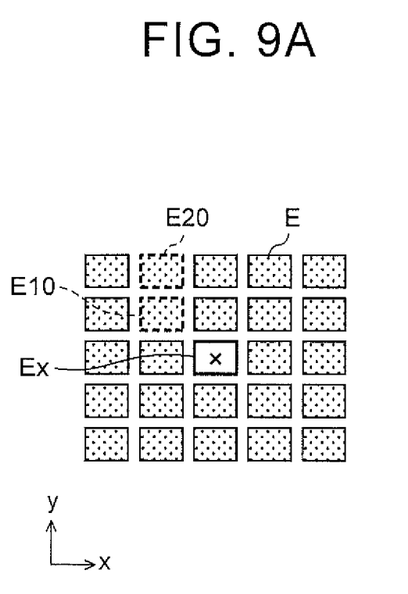
FIG. 9A is a diagram showing a fifth modification of the information processing device to illustrate the arrangement of a selected area and unselected areas.
Figure 9B:
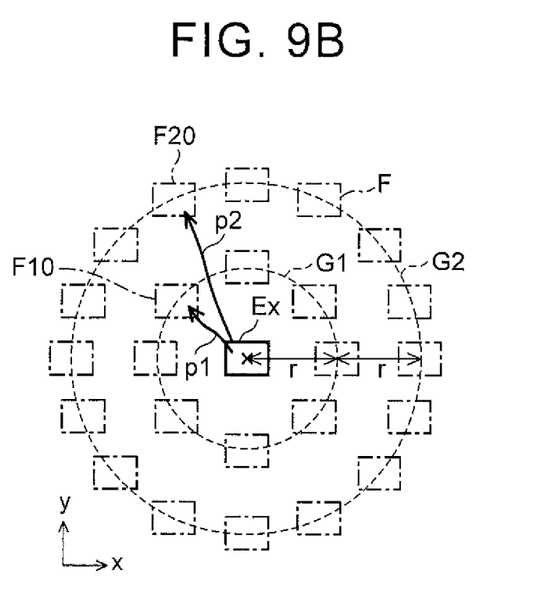
FIG. 9B is a diagram showing the fifth modification of the information processing device to illustrate reaction areas that are set in the arrangement.

FIG. 9A and FIG. 9B are diagrams showing a fifth modification. FIG. 9A shows the state in which the screen is displayed where a plurality of areas E are arranged in a matrix form. It is assumed that the area Ex, one of the plurality of areas E, is the selected area. In FIG. 9B, the reaction areas of the areas E are indicated by the dashed lines. The reaction area of an unselected area, which is m rows and n columns apart from the area Ex in the matrix (m and n are integers equal to or larger than 0, and the relation $m^2+n^2 \neq 0$ is satisfied), is arranged as an alternate area F on the circle Gk with a radius of (k×r) (where r>0) and the center at the position of the area Ex, where the maximum of m and n is k. That is, the alternate area F of each unselected area is set on the circle that has its center at the position of the area Ex with a radius proportional to the Chebyshev distance of the unselected area from the area Ex.

FIG. 9B shows the state in which the alternate areas F, which are the reaction areas corresponding to the eight areas E adjacent to and surrounding the area Ex, are arranged on the circle G1 with a radius of r. FIG. 9B also shows the state in which the alternate areas F, which are the reaction areas corresponding to the 16 areas E positioned outside the eight areas E, are arranged on the circle G2 with a radius of 2r. In FIG. 9B, the direction in which an unselected area is positioned with respect to the position of the area Ex is set equal to the direction in which the alternate area F of the unselected area is positioned with respect to the position of the area Ex. That is, the alternate area F corresponds to an area created by changing at least the position of an area E.

For example, in order to move the selected area from the area Ex to the area E10 that is next to the area Ex in the upper-left diagonal direction in FIG. 9A, the cursor area CA is moved in the same direction as that to the area E10 as indicated by the arrow p1 in FIG. 9B. Then, the cursor area CA overlaps with the alternate area F10 of the area E10 with the result that the area E10 is selected. Similarly, when the cursor area CA is moved in the same direction as that to the area E20 that is one of the areas surrounding the area Ex on the outer side of the area E10 as indicated by the arrow p2 in FIG. 9B, the cursor area CA overlaps with the alternate area F20 of the area E20 with the result that the area E20 is selected.

According to tis modification, when the area Ex is the selected area, the alternate areas F are arranged on circles each with a radius proportional to the Chebyshev distance. Therefore, this modification allows the distance between the first coordinates and the second coordinates, required to select a GUI component not selected by the cursor, to be adjusted to a predetermined distance (radius r, radius 2r). This means that the areas at the same Chebyshev distance can be selected with an equal operation load from the selected area.

According to the information processing device 10 in the embodiment described above, at least one of the coordinate position, shape, and size of a reaction area is set with the first coordinates as the reference point so that the distance between the first coordinates (position coordinates α) and the second coordinates (position coordinates β), required to select a GUI component not selected by the cursor, becomes a predetermined distance (distance STR). That is, even if the arrangement intervals from the first coordinates to the GUI components vary, the distance from the first coordinates to the second coordinates required to select each GUI component is adjusted to a predetermined distance. In this way, the information processing device 10 prevents the user operation load of selecting GUI components from being varied according to the arrangement of the GUI components but allows user operation load to be adjusted to the operation load corresponding to the predetermined distance that is set according to the currently selected GUI component. Therefore, the information processing device 10 can be provided as an information processing device that can reduce the possibility that the user operation load of selecting GUI components varies according to the currently selected GUI component.

In addition, the information processing device 10 in this embodiment sets the predetermined distance according to the density of GUI component arrangement in the layout of the GUI components with the first coordinates as the reference point. More specifically, the relatively smaller the arrangement intervals of the GUI components are, the larger becomes the distance from the first coordinates required for selecting a GUI component not selected by the cursor. Conversely, the relatively larger the arrangement intervals of the GUI components are, the smaller becomes the distance from the first coordinates required for selecting a GUI component not selected by the cursor. When a plurality of GUI components is arranged so near to each other that two or more GUI components are identified by the cursor area at the same time, that is, when a plurality of GUI components are arranged in such a way that the cursor area overlaps with two or more GUI components at the same time, the reaction areas may be set so that the predetermined distance becomes longer than the distance at which two or more GUI components are identified by the cursor area at the same time. When a plurality of GUI components is far enough from each other not to be identified at the same time and, in addition, the distance between a particular GUI component and each of the plurality of GUI components differs, the reaction areas may be set so that the predetermined distances become equal.

That is, the reaction areas of GUI components near to each other are set at the positions that are apart from each other so that they are easily distinguished and selected from the currently selected GUI component. Conversely, the reaction areas of GUI components apart from each other are set at the positions so that they are easily reached from the currently selected GUI component during the input operation. The setting of the reaction areas described above achieves better selection in the overlapping between the selection area and the reaction areas when the user input position coordinates move from the first coordinates to the second coordinates. Therefore, this setting ensures that the variation in the operation load of selecting a reaction area is smaller than when the GUI components are directly distinguished for selection.

According to the information processing device 10 in this embodiment, the plurality of GUI components include the following two GUI components as shown in FIG. 2B. One is another GUI component (area Ec) arranged on one-direction side (positive direction side of the y-axis) with respect to the GUI component (area Ea) at the first coordinates. The other is a still another GUI component (area Ee) arranged in parallel to the GUI component, arranged on the one-direction side, in the direction perpendicular to the one-direction (that is, in the direction along the x-axis). The reaction area setting unit 5 sets the reaction area (alternate area Fe), which corresponds to the still another GUI component (area Ee), using the coordinate range created by extending the area of the still another GUI component (area Ee) along the one-direction (along the y-axis) to the position opposite to the direction perpendicular (along the x-axis) to the GUI component (area Ea) at the first coordinates.

In this configuration, the still another GUI component can be selected by changing the position from the position of the GUI component at the first coordinates to the second coordinates into the direction perpendicular to the first direction. Therefore, the operation load of selecting a desired GUI component from the position of the GUI component at the first coordinates becomes equal to the operation load of selecting the desired GUI component from the position of the another GUI component.

According to the aspect described above, the reaction area setting unit may be con figured such that the smaller an arrangement interval between the first GUI component and the second GUI component is, the larger the predetermined distance is. The reaction area setting unit may be configured such that the larger the arrangement interval between the first GUI component and the second GUI component is, the smaller the predetermined distance is.

According to the aspect described above, the display control unit may be configured to: cause the display unit to arrange and display the second GUI component in a first direction with respect to the first GUI component; and cause the display unit to display a third GUI component in parallel to the second GUI component in a second direction perpendicular to the first direction, and the reaction area setting unit is configured to set a reaction area corresponding to the third GUI component in the predetermined coordinate system using a coordinate range that is along the first direction and is created by extending an area of the third GUI component to a position intersecting with a line extending from the first GUI component in the second direction.

According to the aspect described above, when the first GUI component and the second GUI component are arranged at a distance at which the selection area overlaps with the first GUI component and the second GUI component at the same time, the reaction area setting unit may be configured to set the predetermined distance longer than a distance between the first GUI component and the second GUI component.

According to the aspect described above, the reaction area setting unit may be configured to set a size of the reaction area smaller than a size of the second GUI component.

According to the aspect described above, the reaction area setting unit may be configured to set the reaction area so that a distance between the reaction area and the first GUI component becomes longer than a distance between the first GUI component and the second GUI component.

According to the aspect described above, the display control unit may be configured to display a fourth GUI component arranged at a position where a distance to the second GUI component is shorter than a distance from the second GUI component to the first GUI component and the reaction area setting unit may be configured to set the reaction area so that a first distance and a second distance are equal, the first distance being a distance between the first coordinate and the second coordinate required for the selection area to overlap with the reaction area with an overlapping area exceeding the overlapping criterion when the first coordinate are at the first GUI component, the second distance being a distance between the first coordinate and the second coordinate required for the selection area to overlap with the reaction area with an overlapping area exceeding the overlapping criterion when the first coordinate are at the fourth GUI component.

According to the aspect described above, the reaction area setting unit may be configured to set a reaction area corresponding to the second GUI component in the predetermined coordinate system using a coordinate range created by extending the area of the second GUI component in parallel to a line joining the coordinates at the first GUI component and the coordinates at the fourth GUI component.

According to the aspect described above, the reaction area setting unit may be configured to set at least one of a coordinate position, shape, and size of the reaction area.

What is claimed is:

1. An information processing device comprising:
a pointing device configured to detect an input entered by a user to change position coordinates and to output input-position coordinates change information that includes a first coordinate and a second coordinate, the first coordinate indicating a start point of the input, the second coordinate indicating an end of the input;
a display unit; and
a processor configured to
cause the display unit to display a first GUI component and a second GUI component, the first GUI component being a component selected by a cursor, the second GUI component being a component not selected by the cursor and arranged around the first GUI component,
calculate a displacement of an input position in a predetermined coordinate system based on the input-position coordinates change information, the predetermined coordinate system being defined to be converted to a screen coordinate system of the display unit, set a reaction area, corresponding to the second GUI component, at a location in the predetermined coordinate system using a coordinate range, the coordinate range being determined based on the first coordinate, set a selection area at a location in the predetermined coordinate system based on the second coordinate, the selection area having a predetermined coordinate range corresponding to a size of the first GUI component, wherein the reaction area is set so that a distance between the first coordinate and the second coordinate, required for the selection area to overlap with the reaction area with an overlapping area exceeding a predetermined overlapping criterion, becomes a predetermined distance, determine an identified reaction area, the identified reaction area being the reaction area which overlaps with the selection area with the overlapping area exceeding the predetermined overlapping criterion, and cause the display unit to display the second GUI component, corresponding to the identified reaction area, as selected by the cursor.

2. The information processing device according to claim 1, wherein the processor is configured to:

cause the display unit to arrange and display the second GUI component in a first direction with respect to the first GUI component;

cause the display unit to display a third GUI component in parallel to the second GUI component in a second direction perpendicular to the first direction; and set a reaction area corresponding to the third GUI component in the predetermined coordinate system using a coordinate range that is along the first direction and is created by extending an area of the third GUI component to a position intersecting with a line extending from the first GUI component in the second direction.

3. The information processing device according to claim 1, wherein when the first GUI component and the second GUI component are arranged at a distance such that the selection area overlaps with the first GUI component and the second GUI component at the same time, the processor is configured to set the predetermined distance longer than a distance between the first GUI component and the second GUI component.

4. The information processing device according to claim 3, wherein the processor is configured to set a size of the reaction area smaller than a size of the second GUI component.

5. The information processing device according to claim 3, wherein the processor is configured to set the reaction area so that a distance between the reaction area and the first GUI component becomes longer than a distance between the first GUI component and the second GUI component.

6. The information processing device according to claim 1, wherein the processor is configured to:

display a fourth GUI component arranged at a position where a distance to the second GUI component is shorter than a distance from the second GUI component to the first GUI component; and set the reaction area so that a first distance and a second distance are equal, the first distance being a distance between the first coordinate and the second coordinate required for the selection area to overlap with the reaction area with an overlapping area exceeding the overlapping criterion when the first coordinate are at the first GUI component, the second distance being a distance between the first coordinate and the second coordinate required for the selection area to overlap with the reaction area with an overlapping area exceeding the overlapping criterion when the first coordinate are at the fourth GUI component.

7. The information processing device according to claim 6, wherein the processor is configured to set a reaction area corresponding to the second GUI component in the predetermined coordinate system using a coordinate range created by extending the area of the second GUI component in parallel to a line joining the coordinates at the first GUI component and the coordinates at the fourth GUI component.

8. The information processing device according to claim 1, wherein the processor is configured to set at least one of a coordinate position, shape, and size of the reaction area.

9. The information processing device according to claim 1, wherein the processor is further configured to set the predetermined distance to be larger as an arrangement interval between the first GUI component and the second GUI component becomes smaller, and to set the predetermined distance to be smaller as the arrangement interval between the first GUI component and the second GUI component becomes larger.

* * * * *